(12) United States Patent
Makino

(10) Patent No.: US 6,313,935 B1
(45) Date of Patent: Nov. 6, 2001

(54) SCANNING OPTICAL APPARATUS

(75) Inventor: Hideyo Makino, Tokyo (JP)

(73) Assignee: Ricoh Company Ltd., Tokyo (JP)

( * ) Notice: Subject to any disclaimer, the term of this patent is extended or adjusted under 35 U.S.C. 154(b) by 0 days.

(21) Appl. No.: 09/556,859

(22) Filed: Apr. 21, 2000

(30) Foreign Application Priority Data

Apr. 22, 1999 (JP) .................................................. 11-115292

(51) Int. Cl.[7] .................................................. G02B 26/08
(52) U.S. Cl. .......................... 359/206; 359/204; 359/216
(58) Field of Search ................................... 359/196–219; 347/241–244, 257–261

(56) References Cited

U.S. PATENT DOCUMENTS 4,745,416 * 5/1988 Horihata ................................ 358/296

* cited by examiner

Primary Examiner—James Phan
(74) Attorney, Agent, or Firm—Oblon, Spivak, McClelland, Maier & Neustadt, P.C.

(57) ABSTRACT

A scanning optical apparatus including a rotatable polygon mirror for deflecting laser light flux with equal angular velocity, an f lens for compensating the laser light flux deflected by the rotatable polygon mirror with equal angular velocity to equal velocity deflection, a surface falling-down compensating lens for compensating the surface falling-down of the rotatable polygon mirror for the laser light flux compensated by the f lens and focusing the laser light flux on the surface to be scanned, and a light intercepting member for intercepting laser light flux transmitted through the f lens and directed toward the edge portion at the side of ending the scanning of the surface falling-down compensating lens. The light intercepting member may be a mounting member for mounting the surface falling-down compensating lens, an element mounted on the mounting member. The light intercepting member may also be painted or stuck on the surface falling-down compensating lens or on the mounting member. The scanning optical apparatus further includes plural laser light sources and a single light receiving element.

16 Claims, 5 Drawing Sheets

SCANNING OPTICAL APPARATUS

CROSS REFERENCE TO RELATED APPLICATIONS

This application claims benefit of priority under 35 U.S.C. 120 to Japanese Patent Application No. 11-115292 filed in the Japanese Patent Office on Apr. 22, 1999, the entire contents of which are incorporated by reference herein.

BACKGROUND OF THE INVENTION

1. Field of the Invention

The present invention relates to a scanning optical apparatus for scanning a laser beam, and in particular, a scanning optical apparatus for forming an image by use of an optical scanning, for instance, a laser printer, digital copying machine, facsimile device, etc.

2. Discussion of the Background

FIG. 3 illustrates a conventional scanning optical apparatus in which laser light flux emitted from the semiconductor laser, that is, laser diode 1 is transformed (shaped) to a parallel light flux or an almost parallel light flux by use of a collimator lens 2. The laser light flux thus transformed is directed, as incident light, onto the reflection surface of a rotatable polygon mirror 5 through an aperture 3 and a cylinder lens 4, reflected off a reflection surface thereof, and then deflected with the equal angular velocity.

The laser light flux reflected on the surface of the rotatable polygon mirror 5 is compensated to an equal (constant) velocity deflection by use of an optical element 6 having an f property, and then the surface falling-down of the rotatable polygon mirror 5 is compensated by a plastic lens 7 and transformed to a convergent light.

A surface 10 to be scanned is disposed on a beam west position of the convergent light. A reflection mirror 8 and an optical sensor 9 such as photodiode, etc. for receiving the laser light flux reflected by the reflection mirror 8 are arranged at a synchronization detecting position 11 at the side of starting the scanning outside of the effective light path of the optical element 6 and plastic lens 7 in order to detect the laser light flux per one scanning and determine the timing for starting the image writing.

In such structure as shown in FIG. 1, the plastic lens 7 for compensating the surface falling-down of the rotatable polygon mirror is provided for the purpose of obtaining a high density and a high image quality by use of a line beam spot. However, in order to make the plastic lens 7, a material for the long-length lens such as plastic is used for the reasons of manufacturing and cost. A gate for ejecting the plastic is therefore provided in the plastic lens. Furthermore, in such structure, in order to secure surface accuracy and to avoid worsening of birefringence, the effectiveness (functional effect) of the optical effective portion can be secured by putting a constant distance by use of the gate. Furthermore, since the plastic lens 7 is of long-length, an edge portion 7a is usually provided in order secure the strength thereof, and the above-mentioned gate is formed on the edge portion 7a. Generally, the plastic lens 7 is fixedly support on the edge portion 7a.

Furthermore, since the light intensity of the semiconductor laser 1 varies in accordance with the temperature, etc., the light intensity thereof is monitored by a not-shown photodiode (hereinafter, called "monitor diode"). Thereby, the light intensity is controlled to a constant value (APC control). On this occasion, generally, the light-emitting area is a non-imaging area outside of the effective light path as shown in FIG. 4.

Recently, high-speed operation and high density light flux are required. It has therefore been proposed to scan the surface 10 to be scanned with light flux from plural sources, e.g., by employing an LD array including four semiconductor lasers and a single monitor diode, schematically shown in FIG. 4, since it is impossible to perform APC control at the same time for each respective semiconductor laser 1, such that APC control has to be performed by emitting the light sequentially in order.

For this reason, when the intensity of the light flux in the non-imaging area is increased, or otherwise the scanning time for the non-image area is shortened due to high-speed operation, the light emitting time becomes long in the non-imaging area. Furthermore, when the light for performing the APC control is emitted immediately after finishing the image-writing, as shown in FIG. 5, the light flux entering the edge portion 7a at the side of finishing the image-writing by use of the plastic lens 7 is diffused at the edge portion 7a. At this time, the probability of the flare (20a, 20b) occurrence may be increased. That is a problem to be solved. On the other hand, the same light flux enters the optical element 6 and then arrives at the scanned surface 10. That is another problem to be solved.

Particularly, in the recent years, since there is a tendency that the sensitivity of the photosensitive body is improved and thereby the necessary light intensity is decreased, such that even the light power of weak flare exposes the photosensitive body, and thereby, a back stripe or a fogging occurs, resulting in deterioration of the printed image quality.

Japanese Laid-open Patent Publication No. 5-150621 has proposed a structure in which light passes through the f lens and becomes stray light in the black box, and a pair of ribs are respectively provided at the scan starting side and scan ending side located downstream of the f lens in order to intercept the laser light rays directed outside of the printing area. In such structure, although the property of the f lens is not described in the above specification, since there is provided no surface falling-down compensating correcting lens, it seems that the structure has a property of converting the equal (constant) angular velocity deflection to the equal (constant linear) velocity deflection and also a property of compensating the surface falling-down.

However, the above-mentioned background art takes into consideration only the fact that the light passing through the f lens becomes the stray light in the black box and the laser light rays directed outside of the printing area. Therefore, when the light is lit up at the scan ending side of the f lens for performing APC control, the laser light rays reflected on the rotatable polygon mirror are diffusely reflected on the edge at the scan ending side of the f lens. Consequently, flare directed toward the printing area may occur. That is a problem to be solved.

Furthermore, Japanese Laid-open Patent Publication No. 6-3609 proposes a light intercepting member for intercepting the light flux passing through outside of the optical effective area of the optical system between the optical system partly or entirely composed of the plastic lens and the deflection element.

As still another background art, the published specification of Japanese Laid-open Patent Publication No. 6-5920, proposes structure in which it is prevented that the laser light is unnecessarily reflected by the member supporting the mirror for detecting the horizontal synchronization and thereby the photosensitive body is exposed.

However, in all of the above-mentioned background arts, only the light-intercepting at the side of the synchronization detecting element (optical sensor 9), namely, at the image-writing ending side, i.e., the scan ending side, is not taken into consideration. Consequently, in the case of emitting the light from the time of ending the image-writing, flare may occur on the edge portion 7a at the image writing ending side of the lens 7. That is a problem to be solved.

SUMMARY OF THE INVENTION

Heretofore, the background art regarding the scanning optical apparatus have been described. However, according to such background art as, Japanese Laid-open Patent Publication Nos. 5-150621, 6-3609, and 6-5920, there exists no advantageous functional effect for improving the scanning optical apparatus. The present invention has been made in view of the above-mentioned problems and other problems in order to solve such problems.

To that end, the present invention provides an improved scanning optical apparatus capable of preventing the occurrence of the flare diffusely reflected on the edge portion at the scan ending side of the surface falling-down compensating lens, in the structure for compensating the surface falling-down of the rotatable polygon mirror by use of the surface falling-down compensating lens for the laser light flux passing through the f lens.

The present invention further provides scanning optical apparatus capable of preventing occurrence of the flare in the case of lighting up the light at the scan ending side for performing the APC control.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings; wherein.

DETAILED DESCRIPTION OF THE PREFERRED EMBODIMENTS

Figure 1:
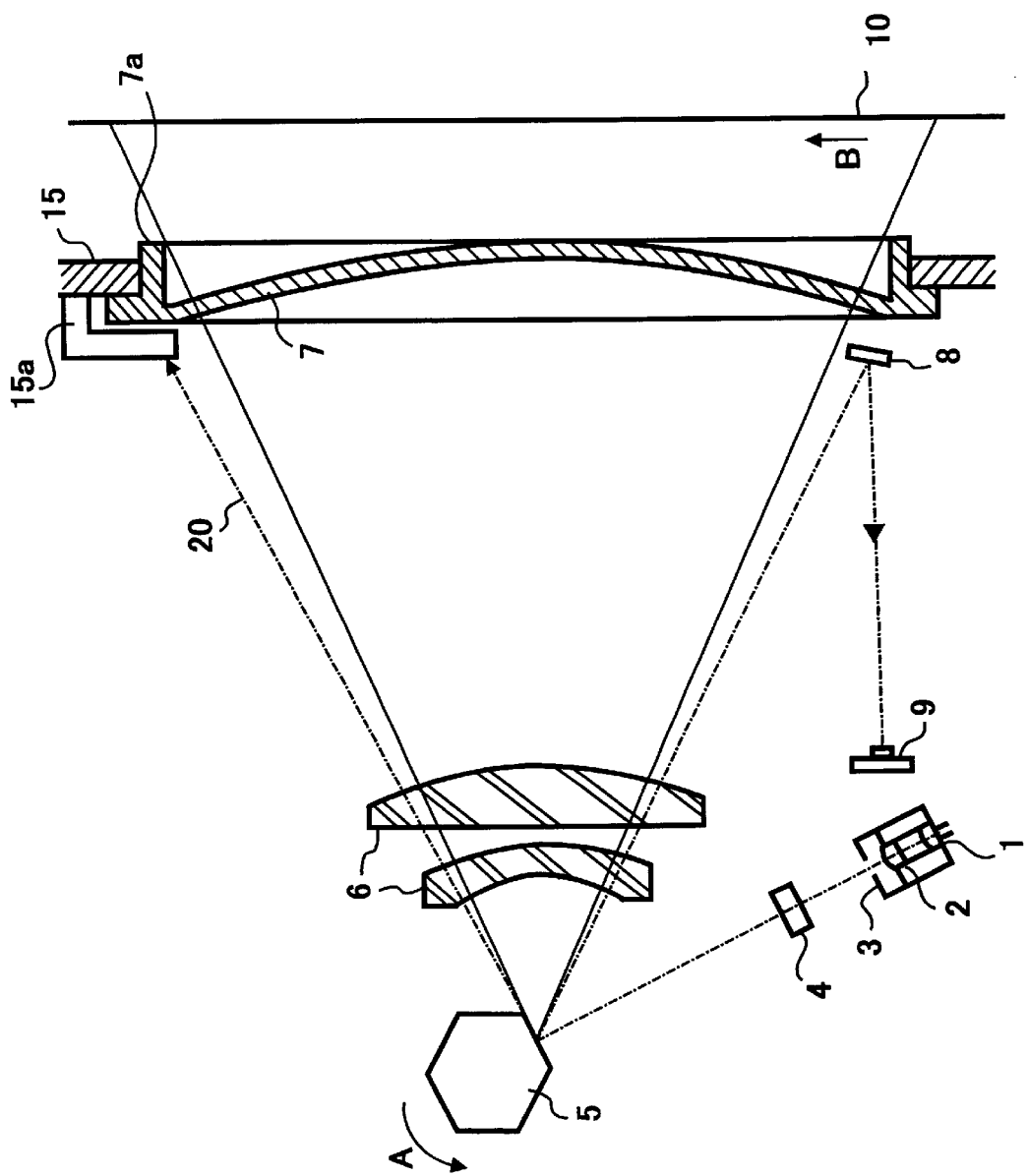
FIG. 1 is a structural diagram illustrating a first embodiment of the scanning optical apparatus according to the present invention.

In describing the preferred embodiments of the present invention illustrated in the drawings, specific terminology is employed for the sake of clarity. However, the invention is not intended to be limited to the specific terminology so selected and it is to be understood that each specific element includes all technical equivalents which operate in a similar manner.

Figure 2:
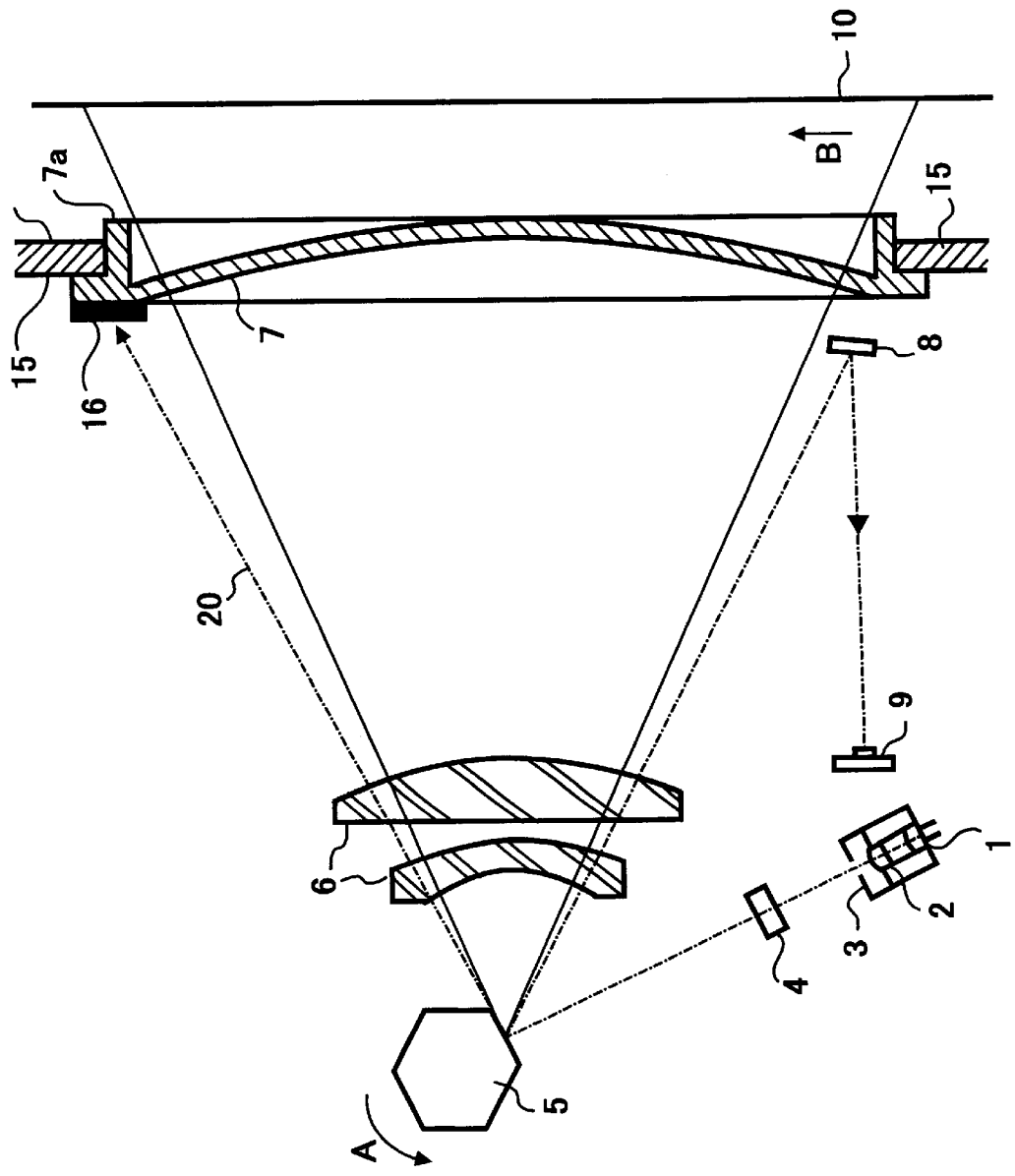
FIG. 2 is a structural diagram illustrating a second embodiment of the scanning optical apparatus according to the present invention.
Figure 3:
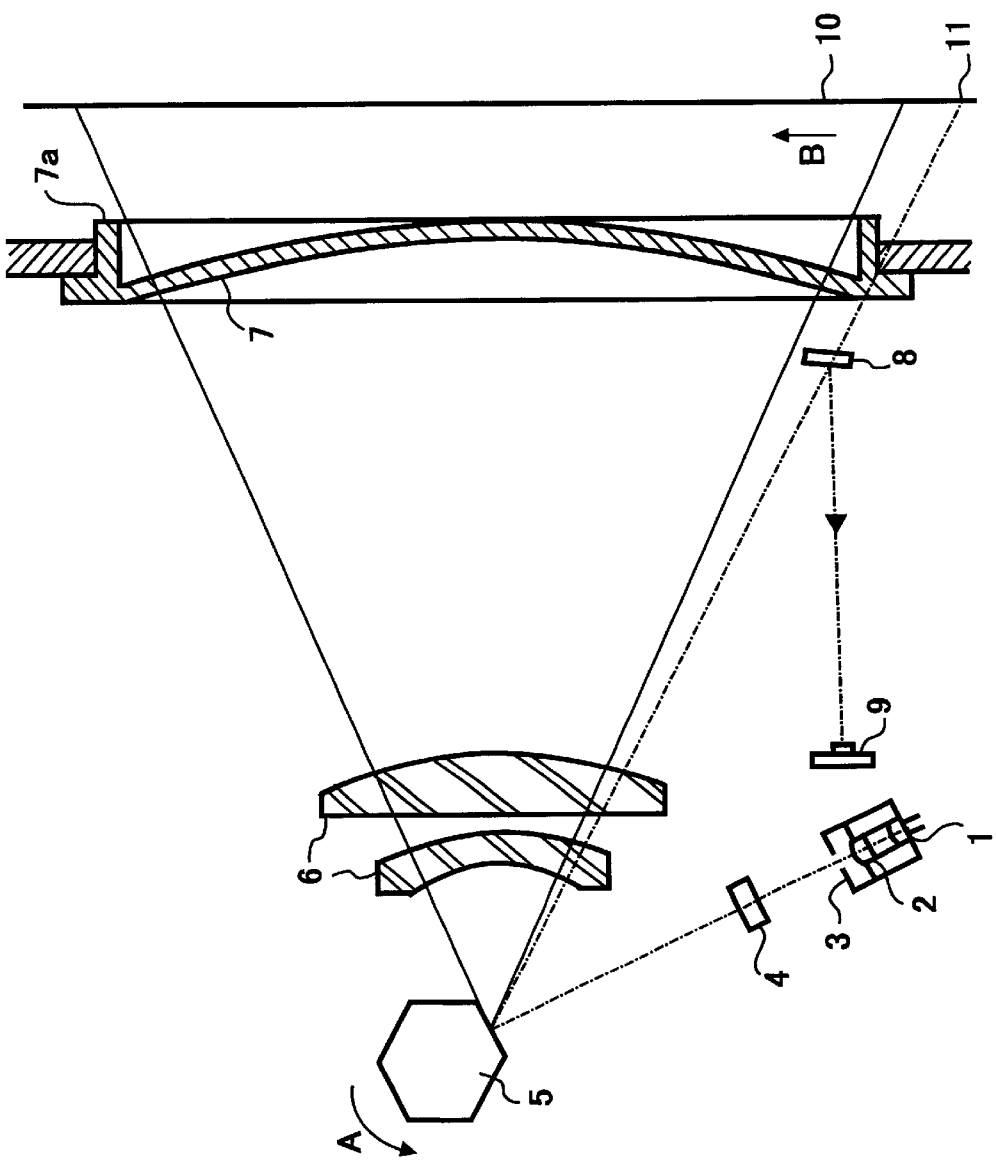
FIG. 3 is a structural diagram illustrating the background-art scanning optical apparatus.
Figure 4:
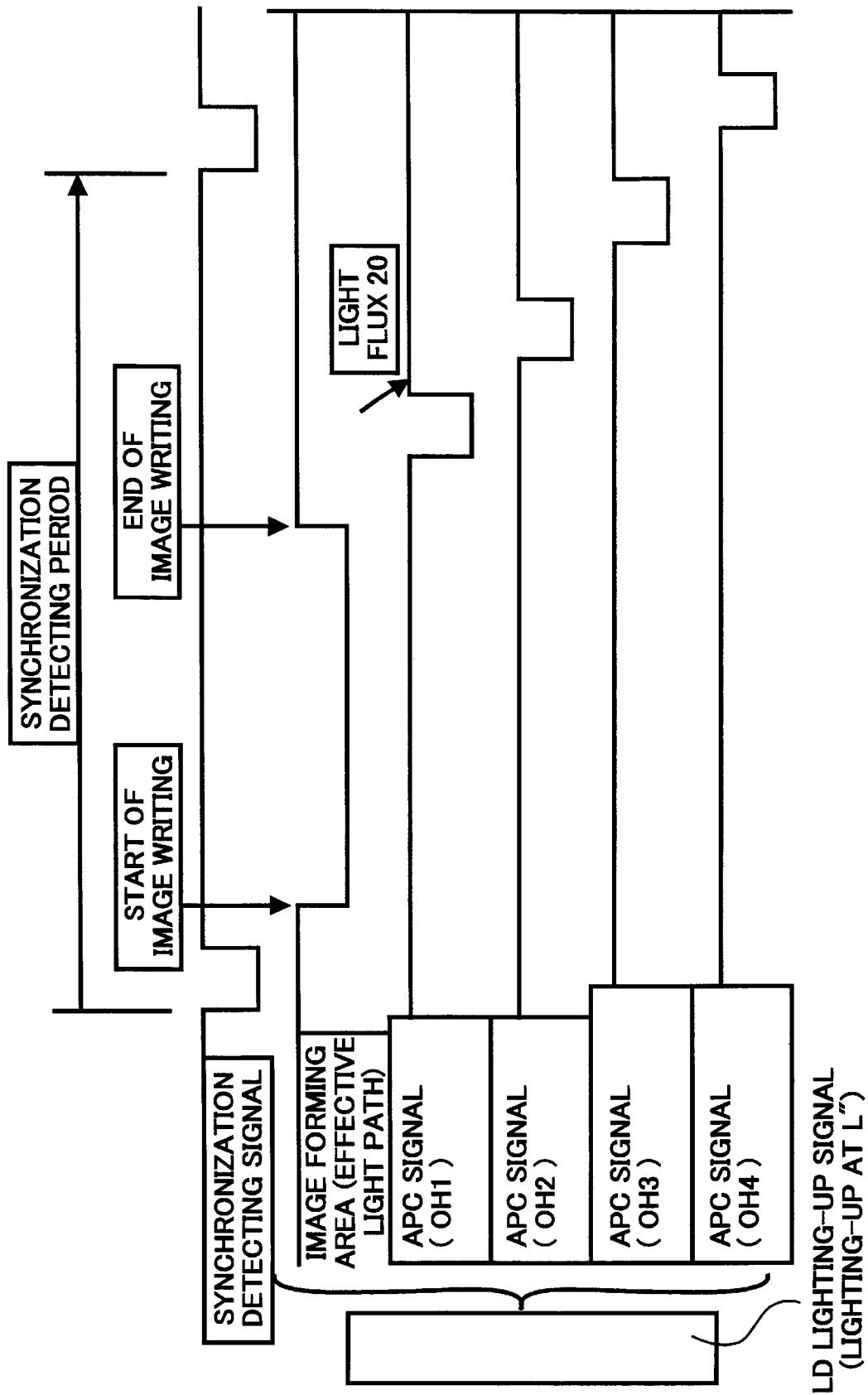
FIG. 4 is a timing chart explaining the timing of lighting-up for performing the APC control.
Figure 5:
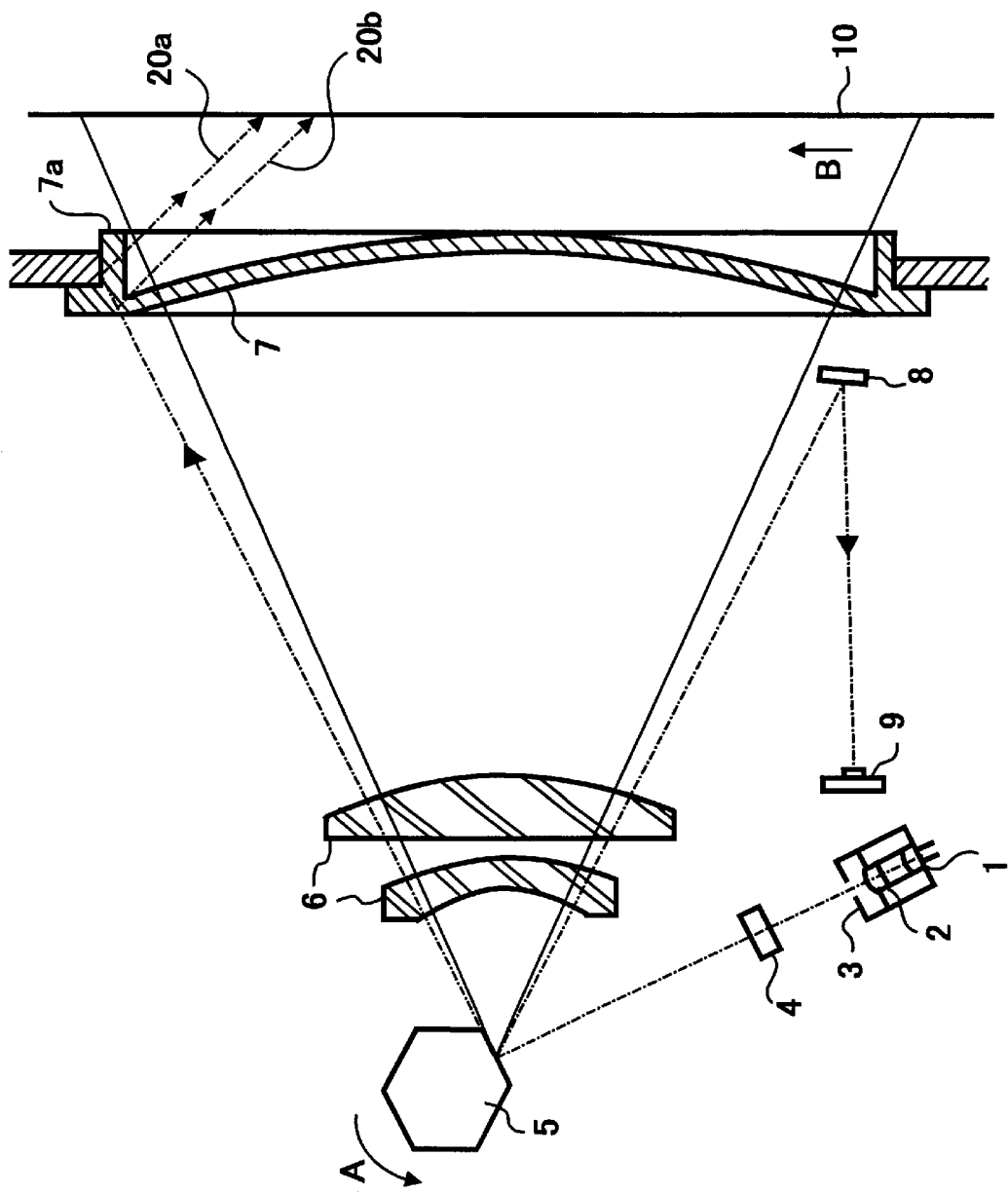
FIG. 5 is explanatory diagram for explaining the source of flare at the side of ending the image-writing.

Referring now to the drawings, wherein like reference numerals designate identical or corresponding parts throughout the several views (diagrams), and more particularly to FIGS. 1 and 2 thereof, there is illustrated a scanning optical apparatus according to the invention capable of forming an image by performing the optical scanning in an image forming apparatus such as a laser printer digital copying machine, facsimile device, etc.

More particularly, the present invention employs four media (first medium through fourth medium) for attaining the objects of the present invention mentioned heretofore.

The first medium is featured in that, in the scanning optical apparatus including a rotatable polygon mirror for deflecting laser light flux with equal angular velocity, an f lens for compensating the laser light flux deflected by the rotatable polygon mirror with equal angular velocity to the equal velocity deflection, and a surface falling-down compensating lens for compensating the surface falling-down of the rotatable polygon mirror for the laser light flux compensated by the f lens and focusing the laser light flux on the surface to be scanned, a light intercepting member is further included and the light intercepting member intercepts the laser light flux transmitted through the f lens and directed toward the edge portion at the site of ending the scanning of the surface falling-down compensating lens.

The second medium is featured in that, in the first medium, the light intercepting member is a mounting member for mounting the surface falling-down compensating lens, or is mounted on the mounting member for mounting the surface falling-down compensating lens.

The third medium is featured in that, in the first medium, the light intercepting member is painted or stuck on the surface falling-down compensating lens or on the mounting member of the surface falling-down compensating lens.

The fourth medium is featured in that, in the first medium through third medium, the scanning optical apparatus further includes plural laser light sources for respectively emitting plural laser light fluxes, and a single light receiving element for monitoring the plural laser light fluxes, wherein the plural laser light sources respectively emit light in order at the side of ending the scanning outside of the effective light path of the surface falling-down compensating lens, and the lights thus emitted from the plural laser light sources are monitored by the single light receiving element and thereby the light intensities of the plural laser light sources are respectively controlled.

FIRST EMBODIMENT

A first embodiment of the scanning optical apparatus of the present invention is described hereinafter, referring to FIG. 1.

In FIG. 1, the lager light flux emitted from a semiconductor laser (laser diode) 1 is transformed or shaped to parallel light flux or almost parallel light flux by use of a collimator lens 2. The laser light flux thus transformed is directed as incident light onto the reflection surface of a rotatable polygon mirror 5 through an aperture 3 and a cylinder lens 4 and reflected thereon, and further deflected with equal angular velocity.

The laser light flux reflected by the rotatable polygon mirror 5 is compensated with equal velocity deflection by an optical system, elements 6, having the f property. Next, the surface falling-down of the rotatable polygon mirror 5 is compensated by a plastic lens 7 and converted to the focused light. A surface 10 to be scanned is disposed on the beam west position of the converged light. Consequently, in such structure, the laser light flux is projected into the scanned surface 10 as a light spot.

Furthermore, a reflection mirror 8 and a light (optical) sensor 9 such as photodiode, etc. for receiving laser light flux reflected off the reflection mirror 8 are arranged at a synchronization detecting position 11 located outside of the effective light path of the optical elements 6 and 7 and at the side of starting the image-writing in order to determine the timing of the position for starting the image-writing by detecting the laser light flux per each one scanning.

An edge portion 7a of the plastic lens 7 is mounted on a mounting member 15 for mounting the lens 7. A light intercepting portion 15a is integrally formed with the mounting member 15 at the side of ending the image-writing of the mounting member 15 namely, at the side of ending the scanning operation. The light intercepting portion 15a prevents light flux 20 from entering the edge portion 7a at the side of ending the image-writing of the plastic lens 7. Furthermore, the light intercepting portion may otherwise be implemented, using for example a separate element, such as a plate spring, etc. for fixing the plastic lens 7, instead of integrally forming the light intercepting portion 15a together with the mounting member 15. Such structure of the scanning optical apparatus can be made with low cost.

SECOND EMBODIMENT

A second embodiment of the scanning optical apparatus of the present invention is described referring to FIG. 2. In FIG. 2, in order to prevent the light flux 20 from entering the edge portion 7a of the plastic lens 7 at the side of ending the image-writing, a light intercepting member 16 is directly painted or stacked on the edge portion 7a of the plastic lens 7. As the material of the light intercepting member 16, for instance, it may be possible to use Myler, Moltoplain, light-intercepting paints, etc., through which the light cannot pass.

As is apparent from the foregoing description, according to the present invention, the subject matters as mentioned before have been improved.

Since the scanning optical apparatus is provided with the light intercepting member for intercepting the laser light flux passing through the f lens and directed to the edge portion of the surface falling-down compensating lens at the side of ending the scanning thereof, it is possible to prevent the flare diffusely reflected at the edge portion of the surface falling-down compensating lens at the side of ending the scanning. In particular, in the case of lighting up the light at the side of ending the scanning in order to perform the ARC control, the occurrence of the flare can be prevented.

Furthermore, since the above-mentioned light intercepting member is the mounting member for mounting the surface falling-down compensating lens or the same member is mounted on the above mounting member, it is possible to prevent, at low-cost, the occurrence of the flare diffusely reflected on the edge portion of the surface falling-down compensating lens on the edge portion at the side of ending the scanning thereof.

Furthermore, since the light intercepting member is painted or stuck to the surface falling-down compensating lens or the mounting member for mounting the above member thereon, it in possible to prevent, at low cost, the occurrence of the flare diffusely reflected on the edge portion of the surface falling-down compensating lens on the edge portion at the side of ending the scanning thereof.

Furthermore, in the case of lighting up the light at the side of ending the scanning in order to perform the APC control, the occurrence of the flare can be also prevented.

The preferred embodiments of the present invention have been described heretofore. However, numerous additional embodiments and modifications or variations of the present invention are possible in light of the above teachings. It is therefore to be understood that within the scope of the appended claims, the present invention may be practiced otherwise than as specifically described herein.

What is claimed as new and is desired to be secured by Letters Patent of the United States:

1. A scanning optical apparatus comprising:
    a rotatable polygon mirror for defecting laser light flux with equal angular velocity;
    an f lens for compensating the laser light flux deflected by said rotatable polygon mirror with equal angular velocity to equal velocity deflection;
    a surface falling-down compensating lens for compensating the surface falling-down of said rotatable polygon mirror for the laser light flux compensated by said f lens and focusing said laser light flux on the surface to be scanned, and
    a light intercepting member which intercepts the laser light flux transmitted through said f lens and directed toward the edge portion at the side of ending the scanning of said surface falling-down compensating lens.

2. The scanning optical apparatus as defined in claim 1, wherein said light intercepting member comprises a mounting member for mounting said surface falling-down compensating lens.

3. The scanning optical apparatus as defined in claim 1, wherein said light intercepting member is mounted on a mounting member for mounting said surface falling-down compensating lens.

4. The scanning optical apparatus as defined in claim 1, wherein said light intercepting member is painted on said surface falling-down compensating lens.

5. The scanning optical apparatus as defined in claim 1, wherein said light intercepting member is stuck on said surface falling-down compensating lens.

6. The scanning optical apparatus as defined in claim 2, wherein said light intercepting member is painted on said surface falling-down compensating lens.

7. The scanning optical apparatus as defined in claim 2, wherein said light intercepting member is stuck on said surface falling-down compensating lens.

8. The scanning optical apparatus as defined in claim 3, wherein said light intercepting member is painted on said surface falling-down compensating lens.

9. The scanning optical apparatus as defined in claim 3, wherein said light intercepting member is stuck on said surface falling-down compensating lens.

10. The scanning optical apparatus as defined in claim 1, wherein said light intercepting member is painted on said mounting member of said surface falling-down compensating lens.

11. The scanning optical apparatus as defined in claim 1, wherein said light intercepting member is stuck on said mounting member of said surface falling-down compensating lens.

12. The scanning optical apparatus as defined in claim 2, wherein said light intercepting member is painted on said mounting member of said surface falling-down compensating lens.

13. The scanning optical apparatus as defined in claim 2, wherein said light intercepting member is stuck on said mounting member of said surface falling-down compensating lens.

14. The scanning optical apparatus as defined in claim 3, wherein said light intercepting member is painted on said mounting member of said surface falling-down compensating lens.

15. The scanning optical apparatus as defined in claim 3, wherein said light intercepting member is stuck on said mounting member of said surface falling-down compensating lens.

16. The scanning optical apparatus as defined in any one of the all preceding claims 1–15, further comprising:
   plural laser light sources for respectively emitting plural laser light fluxes; and
   a single light receiving element for monitoring said plural laser light fluxes;
   wherein said plural laser light sources respectively emit light in order at a side of ending scanning outside of a effective light path of said surface falling-down compensating lens; and
   wherein said lights fluxes thus emitted from said plural laser light sources are monitored by said single light receiving element and thereby the light intensities of said plural laser light sources are respectively controlled.

* * * * *